April 23, 1957 R. M. BAILEY 2,789,537
PIGLING FEED TROUGH
Filed July 6, 1955

Rufus M. Bailey
INVENTOR.

United States Patent Office 2,789,537
Patented Apr. 23, 1957

2,789,537

PIGLING FEED TROUGH

Rufus M. Bailey, Goldsboro, N. C.

Application July 6, 1955, Serial No. 520,273

5 Claims. (Cl. 119—61)

The present invention relates to new and useful improvements in feeders particularly for orphaned piglings and has for its primary object to provide, in a manner as hereinafter set forth, a trough or receptacle comprising novel means for inducing and helping the unweaned animals to drink milk or other fluids therefrom.

Other objects of the invention are to provide a feed trough of the character described which will be comparatively simple in construction, strong, durable, compact, sanitary and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
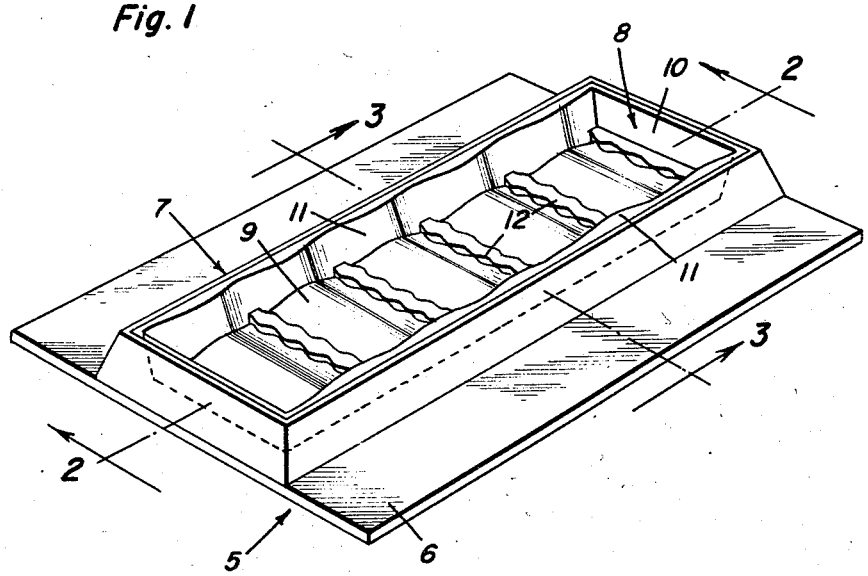
Figure 1 is a perspective view of a feed trough or receptacle constructed in accordance with the present invention.
Figure 2:
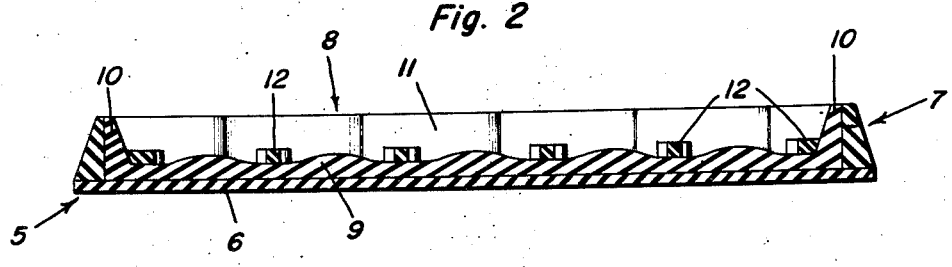
Figure 2 is a view in vertical longitudinal section through the device, taken substantially on line 2—2 of Figure 1.
Figure 3:
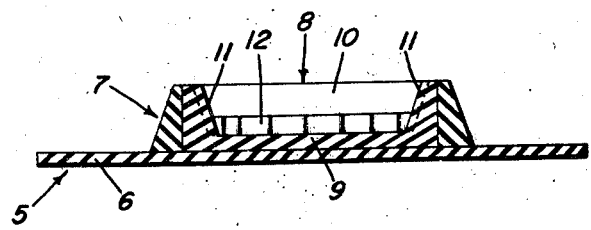
Figure 3 is a cross sectional view, taken substantially on the line 3—3 of Figure 1.

Referring now to the drawing in detail, it will be seen that the embodiment of the invention which has been illustrated comprises a substantially rectangular holder of rubber or other suitable material which is designated generally by reference character 5. The holder 5 includes a base 6 having mounted longitudinally thereon in inwardly spaced relation to the longitudinal edges thereof an elongated frame 7. The outer faces of the walls of the frame 7 are inclined inwardly and upwardly as shown to advantage in Figures 2 and 3 of the drawing.

The holder 5 is for the reception of a shallow pan or tray 8 of rubber or other suitable material. The tray 8 includes a transversely undulated bottom 9 and end and side rails 10 and 11, respectively, which are in face abutting engagement with the corresponding walls of the frame 7. The inner faces of the tray walls 10 and 11 are inclined upwardly and outwardly, as also shown to advantage in Figures 2 and 3 of the drawing. Further, the side walls 11 of the tray 8 are undulated. The tray 8 still further includes scalloped bars 12 of rubber or other suitable material which are mounted in the valleys or depressions of the undulated bottom 9 of said tray and extend between the side walls 11 thereof.

In use, the tray 8 is filled to the desired level with warm milk, for example. When a young pig, accustomed to sucking, immerses its nose or snout in the milk and contacts the obstructions or protuberances provided by the scalloped bars 12 and the undulated members 9 and 11, it immediately begins to drink. The bevelled walls of the frame 7 facilitate access to the trough 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed now is as follows:

1. A feed trough of the character described comprising: a tray for the reception of feed, and a plurality of scalloped members mounted in the lower portion of said tray.

2. A feed trough of the character described comprising: a tray for the reception of feed, said tray including an undulated bottom defining valleys, and substantially scalloped bars mounted longitudinally in the valleys.

3. A feed trough of the character described comprising: a tray for the reception of feed, said tray including an undulated bottom and side walls defining valleys, and scalloped bars mounted in the valleys of said bottom and extending between said side walls.

4. A feed trough of the character described comprising: a holder including a base and an upstanding frame on said base in inwardly spaced relation to certain of the edges thereof, and a tray, for the reception of feed, mounted in the frame and resting on the base, said tray including an undulated bottom defining valleys, and scalloped bars mounted longitudinally in the valleys.

5. A feed trough of the character described comprising: a tray for the reception of feed, said tray including an undulated bottom defining valleys and further including inclined end walls, said tray still further including inclined undulated side walls, and scalloped bars mounted in the valleys and extending between said side walls.

References Cited in the file of this patent
UNITED STATES PATENTS

| | | |
|---|---|---|
| 1,257,399 | Robbins | Feb. 26, 1918 |
| 2,213,837 | Gill | Sept. 3, 1940 |
| 2,280,537 | Murphy | Apr. 21, 1942 |